UNITED STATES PATENT OFFICE.

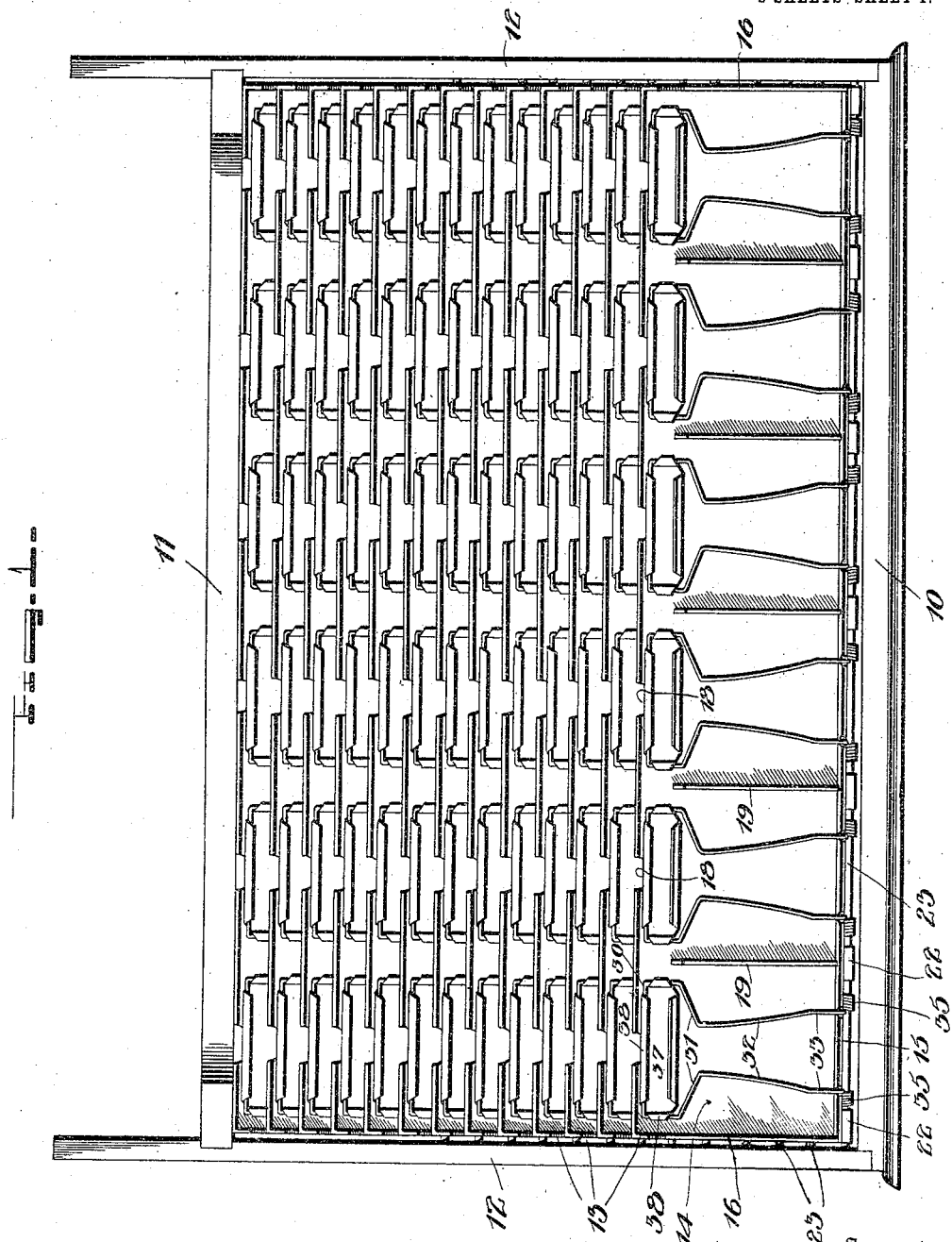

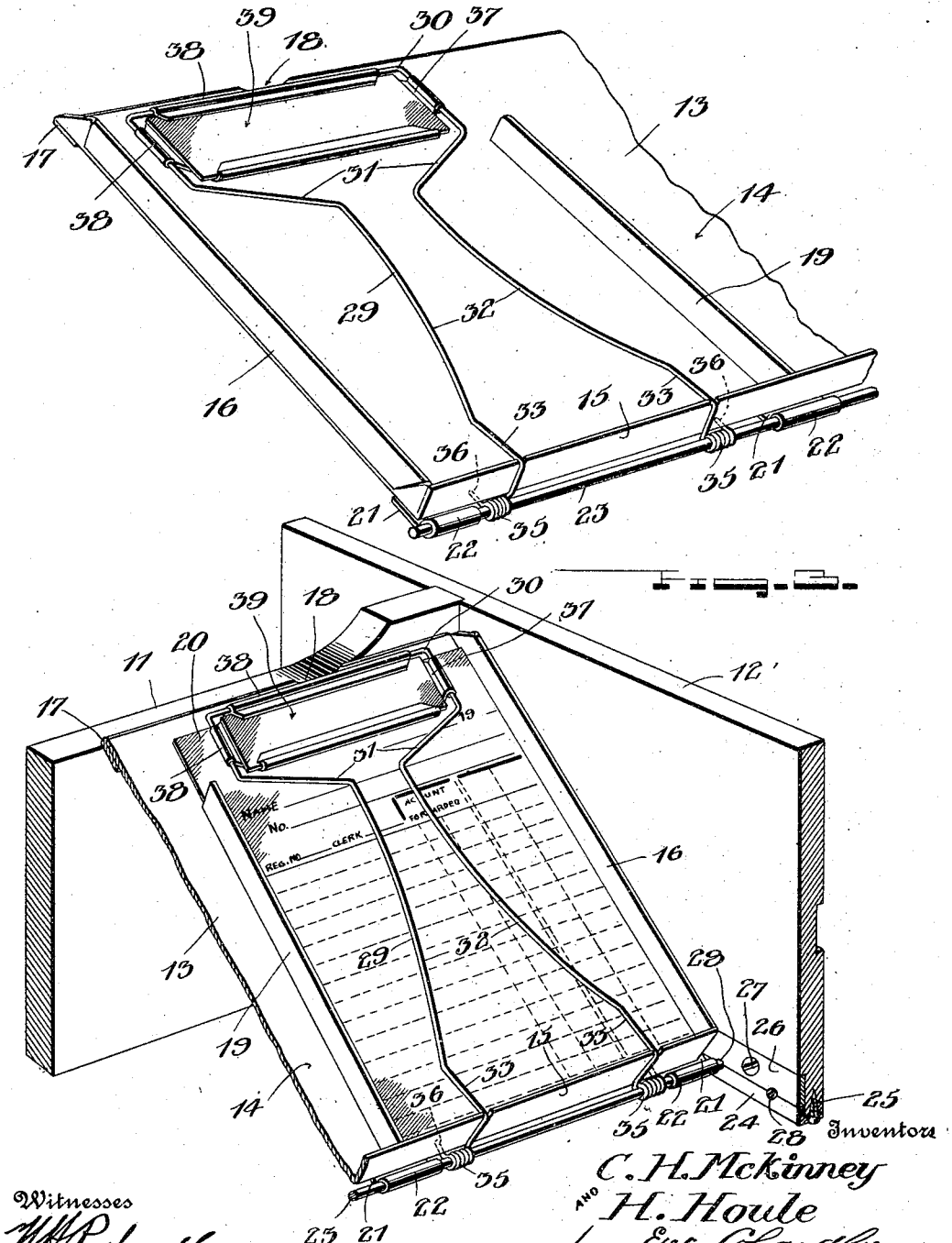

CHARLES H. McKINNEY AND HENRY HOULE, OF HELENA, MONTANA.

ACCOUNTING DEVICE.

1,053,052.    Specification of Letters Patent.    Patented Feb. 11, 1913.

Application filed March 7, 1912. Serial No. 682,325.

*To all whom it may concern:*

Be it known that we, CHARLES H. McKINNEY and HENRY HOULE, citizens of the United States, residing at Helena, in the county of Lewis and Clark and State of Montana, have invented certain new and useful Improvements in Accounting Devices, of which the following is a specification.

This invention relates to accounting appliances for keeping account of credits, debits, daily sales, etc., without requiring other entries than those already made when making up and filling orders for goods.

An object of the present invention is to provide a cabinet drawer having a plurality of rearwardly inclining pivoted leaves, each equipped with trays for the reception of individual credit slips or the like, the slips being held fast to the trays through the instrumentality of novel spring controlled designation plates, the leaves being so secured in the drawer that all of the designation plates are exposed to view.

A second object of the invention is to provide novel means for attaching the hinged leaves to the sides of the drawer so that the leaves may be readily removed when desired, this means furthermore so securing the leaves as to positively prevent of their falling out from the drawer should the latter be dropped upon withdrawal from the file cabinet.

With the above objects in view the invention consists of certain novel details of construction and combination of parts hereinafter fully described and claimed, it being understood that various modifications may be made in the minor details of construction within the scope of the appended claim.

In the accompanying drawings forming part of this specification:—Figure 1 is a plan view of the device. Fig. 2 is a detail perspective view of one of the leaves. Fig. 3 is a fragmentary perspective view showing the manner of securing the leaves.

Referring now to the drawings in which like characters of reference designate similar parts, the device includes a drawer having a front wall 10, rear wall 11, and side walls 12, and arranged in this drawer are a plurality of rearwardly inclining hinged leaves 13 which will now be described in detail.

Each leaf consists of a single sheet of metal 14 the lower edge of which is bent at a right angle and form a ledge 15, and the end edges of which are bent at a right angle to the ledge as shown at 16, the upper edge of the leaf being bent back upon itself to form a head 17, there being thumb notches 18 formed at spaced intervals in the bead. Arranged on the leaf are parallel strips 19 spaced apart sufficiently to divide the leaf into compartments of sufficient size to receive the credit slips 20, the thumb notches being arranged on the center line of each compartment.

For hingedly securing each leaf in position, a plurality of straps 21 are fixed to the rear face of the leaf and extend below the bottom of the leaf, being there bent back to form hinge eyes 22 through which a single pintle 23 is passed, the ends of the pintle projecting beyond the ends of the leaf and being journaled in the sides of the drawer in the following manner: An angle iron 24 is embedded in a countersink formed in the inner face of each side these angle irons being removably secured in position through the instrumentality of screws 25 or the like passed into the lower edges of the sides. Metal strips 26 are secured in said countersinks through the instrumentality of screws 27, and formed in the confronting edges of these strips and the angle irons are semi-circular openings 28 which coöperate in journaling the pintle.

It will be noted that by virtue of the above described method of hingedly securing the leaves to the sides, the leaves cannot become displaced from the drawer should the latter be accidentally dropped and that furthermore upon removal of either one of the angle iron strips any particular leaf may be bodily detached from the drawer when desired.

For retaining the credit slips in their respective compartments, we provide a plurality of clamps, each consisting of a single length of resilient wire 29 bent centrally upon itself to form a substantially oblong open loop 30, those portions of the wire forming the lower side of the oblong loop being bent so as to converge as shown at 31, thence being extended in divergent relation as shown at 32, thence being extended in parallelism as shown at 33, these parallel portions seating in notches 34 formed in the shelf 15, the terminals being finally wrapped about the pintle as shown at 35, and the extreme ends directed to bear against the rear side of the shelf as shown at 36 to form springs.

An oblong blank of material 37 is bent terminally to form eyes 38 which encircle the ends of the open loop, the longitudinal edges of the blank being bent over the body of the blank to form grooves for the reception of a designation slip 39, the groove on the upper side of the blank embracing the upper side of the open loop as shown. The clamp formed as above described presses the related credit slip against the leaf 14, removal of the leaf being effected by inserting the thumb or fore-finger in the related thumb notch, and rocking the clamp outwardly against the tension of its spring.

It will be noted, and this feature is deemed of importance, that the hinged leaves incline rearwardly in the drawer, the partition strips 19 of each leaf bearing against and spacing the next adjacent leaf so that any particular leaf may be readily grasped for rocking to open position whereby to expose the leaf next in rear for examination of the desired credit slip thereon. The rearmost leaf bears against the rear wall of the drawer and maintains all of the leaves at such an angle that the designation slips thereof are exposed at all times for inspection so that any desired credit slip may be easily and quickly examined.

What is claimed, is:—

In an accounting device, a turning shaft, a leaf fixed to said shaft and having a ledge on the lower edge, parallel strips on said leaf engaging and coacting with said ledge in forming a compartment, there being a thumb notch formed in the upper edge of said leaf, there being spaced notches formed in the edge of said ledge on opposite sides of said thumb notch, a clamp comprising a wire loop having the legs engaged through said ledge notches and terminally wrapped about said shaft, thence directed to engage the underneath face of said leaf to form a spring, and a designation plate carried in the bight of said loop in registration with said thumb notch.

In testimony whereof we affix our signatures, in the presence of two witnesses.

CHARLES H. McKINNEY.
HENRY HOULE.

Witnesses:
G. W. PFAFF,
J. H. BRASS.

---

Copies of this patent may be obtained for five cents each, by addressing the "Commissioner of Patents, Washington, D. C."